June 17, 1958  C. E. LICA  2,838,838

ADJUSTABLE PROFILE TEMPLATE

Filed March 19, 1957

INVENTOR
CLARENCE E. LICA

BY
ATTORNEY

# United States Patent Office 2,838,838
Patented June 17, 1958

2,838,838

ADJUSTABLE PROFILE TEMPLATE

Clarence E. Lica, Chicago, Ill., assignor to Teletype Corporation, Chicago, Ill., a corporation of Delaware Application March 19, 1957, Serial No. 646,987

6 Claims. (Cl. 33—23)

This invention relates to a template for profiling machines and more particularly to an adjustable template for guiding the cutting tool of a profiling machine cutting elongated slots in articles.

It is an object of the present invention to provide a simple and readily adjustable template.

Another object of the invention is the provision of a template which may be utilized for controlling cutting tools cutting elongated slots in articles.

A still further object of the invention is a template for use with a pantograph profiling machine.

A still further object of the invention is to provide a template for guiding a roller which in turn guides a cutter wherein adjustments may readily be made without changing the cutter or roller.

In accordance with one embodiment of the invention a template is provided which comprises a pair of side guides pivotally connected at their ends to a pair of links to form a parallelogram. The links are pivoted at their midpoint whereby the side guides may be adjusted toward or away from a center line running through the pivot points for the two links and the side guides will always be maintained parallel one with the other and equal distances from the center line.

A better understanding of the invention may be had by reference to the following detailed description when considered in conjunction with the accompanying drawings wherein.

Figure 1:
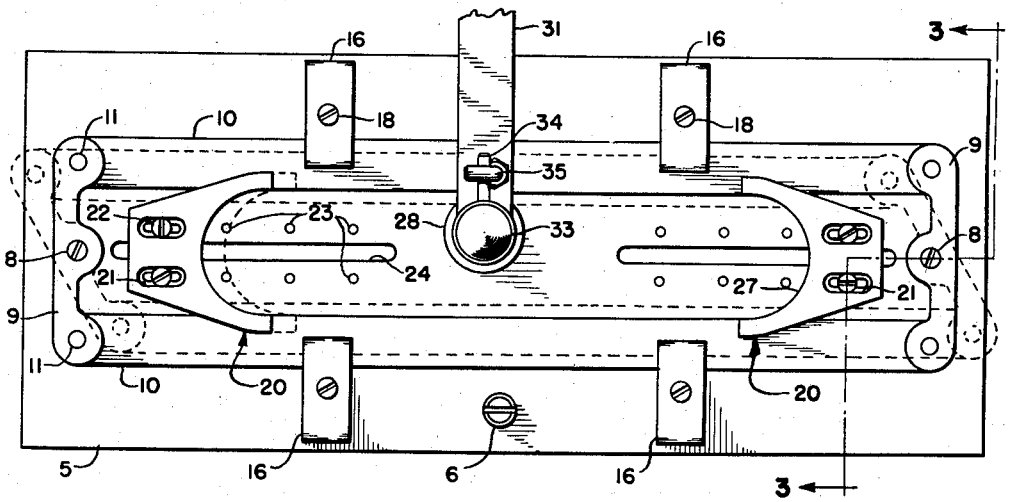
Fig. 1 is a plan view of a template illustrative of the present invention.
Figure 2:
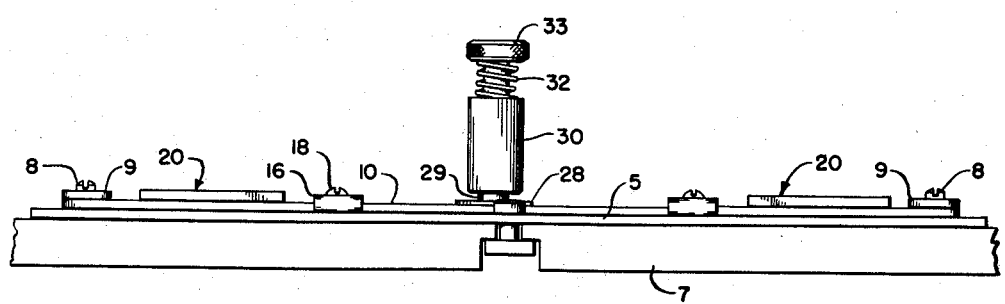
Fig. 2 is a side elevational view of the apparatus shown in Fig. 1 mounted on the template bed of a pantograph profiling machine.

Referring now to the drawings wherein like reference characters designate the same parts throughout the several views, the template comprises a base member 5 which may be suitably attached to the bed of a profiling machine. While the embodiment of the invention illustrated herein is designed for use in connection with a pantograph profiling machine it is believed to be obvious that it may be used with other types of mechanism where it is desirable to guide an element in a path that is elongated and straight sided. The base 5 is provided with suitable clamp screws 6 one of which is illustrated in Figs. 1 and 2. These clamp screws may be utilized to clamp the base 5 onto the template bed 7 of a profiling machine which is usually provided for holding a template. In the embodiment of the invention illustrated herein the base 5 is rectangular in shape and is suitably apertured to receive a pair of pivot pins 8. The pivot pins 8 pivotally support a pair of links 9. These links 9 are pivotally interconnected with a pair of side guides 10.

Figure 3:
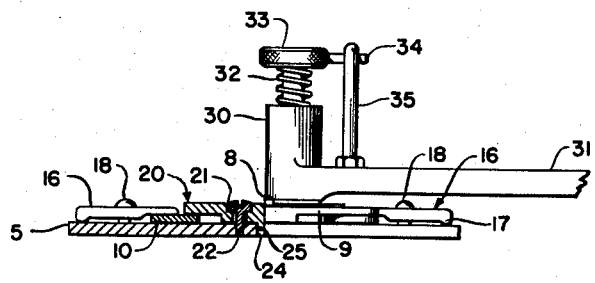
Fig. 3 is an irregular vertical sectional view taken along the line 3—3 of Fig. 1 in the direction of the arrows.

The side guides 10 are pivoted to the links 9 by means of pivot pins 11 at points equidistant from the pivot pin 8. Thus the assemblage of the links 9 and side guides 10 form a parallelogram, the effective width of which may be varied by rocking the links 9 about the pivot pins 8 as indicated by the dot and dash lines in Fig. 1. Any rocking or oscillatory movement of the links 9 will of course change the position of the side guides 10 with respect to a center line which may be extended through the axis of the two pins 8. After the side guides 10 are adjusted to a selected position they may be clamped in place by clamp elements 16 which as most clearly illustrated in Fig. 3 are provided with downwardly extending protuberances 17. The protuberances 17 bear against the upper surface of the base 5 and the inner end of the clamp elements 16 may be brought to bear upon the upper surfaces of the side guides 10 by adjusting screws 18 which are threaded into base 5.

After the side guides 10 have been suitably adjusted a pair of end guides designated generally by the numeral 20 may be locked in position to control the effective length of the template. The end guides 20 are provided with a pair of shouldered slots 21 designed to receive the heads of screws 22. The screws 22 may be threaded into any pair of a series of pairs of threaded apertures 23 in the base 5. The pairs of threaded apertures 23 are disposed adjacent opposite edges of a slot 24 formed in the base 5 and designed to receive a guide rib 25 which is formed integrally with the end guide 20. The inner or guiding surface of the end guide 20 is rounded as shown at 27 to cooperate with the inner edges of the side guides 10 in guiding a roller 28.

The roller 28 is mounted for free rotation at the bottom of a shaft 29 which is freely slidable in a boss 30 formed on the end of a pantograph lever 31. The shaft 29 is normally urged upwardly by a compression spring 32 interposed between the upper surface of the boss 30 and a knurled head 33 on the shaft 29. The knurled head 33 has a pin 34 extending radially outwardly from it which may be engaged beneath a horizontally extending portion of a locking member 35 suitably mounted on the lever 31. By means of the just described arrangement the roller 28 may be held in a downward position where its peripheral surface will be in position to engage the inner surface of the side guides 10 and the rounded surfaces of the end guides 20. However, when it is desired to remove the template or to remove the roller 28 from association with the template, the knurled head 33 may be manipulated to turn the shaft 29 and permit the spring to move the shaft upwardly after the pin 34 is disengaged from the locking member 35.

It is believed to be apparent that by the use of the template the spacing of the side guides and the end guides may be varied any desired amount within the limits of the size of the template and the size of the links and guide elements and once a suitable sized roller 28 has been selected the side guides and end guides may suitably be adjusted to vary the effective width of the slot defined by the side guides 10 and the effective length of the slot as defined by the end guides 20 without the necessity of changing rollers or cutting tools. While a specific embodiment of the invention has been described hereinbefore it will be understood that variations may be made in the structural elements without departing from the scope of the invention.

What is claimed is:

1. A template comprising side guide members, a pair of links pivotally interconnected to the side guide members to form a parallelogram, clamping means for holding said side guide members in adjusted position, and end guide members slidably adjustable between said side guide members.

2. A template for use in a pantograph profiling machine comprising side guide members, a pair of links pivotally interconnected to the side guide members to"

maintain said side guide members in parallel relation one to the other, clamping means for holding said side guide members in adjusted positions and end guide members slidably adjustable between said side guide members.

3. A template for use in a pantograph profiling machine comprising side guide members, a pair of links pivotally interconnected to the side guide members adjacent to the ends of the links and to the side guide members to maintain said side guide members in parallel relation one to the other, clamping means for holding said side guide members in adjusted positions, end guide members slidably adjustable between said side guide members, a roller for engagement with said side guide members and end guide members, and means for locking said roller in position to engage said members.

4. A template for use in a pantograph profiling machine comprising a base, a pair of links pivoted intermediate their ends on said base, a pair of side guide members pivotally interconnected to said links at points equidistant from the point of pivotal support of said links, clamping means for holding said guide members in adjusted positions, a pair of end guide members each having a guiding rib formed on it, guide surfaces formed in said base for engaging said guiding rib, and means for attaching said end guide members to said base in any of a plurality of adjusted positions.

5. A template for use in a pantograph profiling machine comprising a base, a pair of links pivoted intermediate their ends on said base, a pair of side guide members pivotally interconnected to said links at points equidistant from the point of pivotal support of said links, clamping means for holding said side guide members in adjusted positions, a pair of end guide members each having a guiding rib formed on it, guide surfaces formed in said base for engaging said guide rib, means for attaching said end guide members to said base in any of a plurality of adjusted positions, a roller for engagement with said side guide members and end guide members, resilient means for urging said roller out of association with said end guide members and side guide members, and locking means for locking said roller in position to be engaged with the side guide members and end guide members.

6. A template comprising side guide members, a pair of links pivotally interconnected to the side guide members to form a parallelogram, clamping means for holding said side guide members in adjusted position, end guide members slidably adjustable between said side guide members, a roller for engagement with said side guide members and end guide members, resilient means for urging said roller out of association with said end guide members and side guide members, and locking means for locking said roller in position to be engaged with the side guide members and end guide members.

No references cited.